/ United States Patent (12) United States Patent
Kadowaki (10) Patent No.: US 10,838,213 B2
(45) Date of Patent: Nov. 17, 2020

(54) DISPLAY DEVICE (71) Applicant: Panasonic Intellectual Property Management Co., Ltd., Osaka (JP)

(72) Inventor: Shinichi Kadowaki, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 211 days.

(21) Appl. No.: 16/039,299

(22) Filed: Jul. 18, 2018

(65) Prior Publication Data
US 2018/0348525 A1 Dec. 6, 2018

Related U.S. Application Data (63) Continuation of application No. PCT/JP2017/031293, filed on Aug. 31, 2017.

(30) Foreign Application Priority Data

Aug. 31, 2016 (JP) ................. 2016-170142

(51) Int. Cl.
G02B 27/14 (2006.01)
G02B 27/01 (2006.01)
G02B 26/10 (2006.01)

(52) U.S. Cl.
CPC ....... *G02B 27/0172* (2013.01); *G02B 26/101* (2013.01); *G02B 2027/0123* (2013.01); *G02B 2027/0178* (2013.01)

(58) Field of Classification Search
CPC .............. G02B 27/0172; G02B 26/101; G02B 2027/0123; G02B 2027/0178
See application file for complete search history.

(56) References Cited

U.S. PATENT DOCUMENTS 6,185,045 B1 2/2001 Hanano
2011/0128602 A1* 6/2011 Hamano ............ G02B 26/0841
359/205.1

FOREIGN PATENT DOCUMENTS

JP 3943680 B 7/2007
WO WO 2015/135775 A1 * 3/2014 ............. G02B 27/01
WO 2015/132775 A1 9/2015

OTHER PUBLICATIONS

International Search Report of PCT application No. PCT/JP2017/031293 dated Nov. 21, 2017.

(Continued)

*Primary Examiner* — Joseph P Martinez
(74) *Attorney, Agent, or Firm* — McDermott Will & Emery LLP (57) ABSTRACT

A display device includes a light source, a first optical system, a first mirror, a changing element, and a second optical system. The light source emits a light beam. The first optical system converts the light beam emitted from the light source into a collimated light beam. The first mirror reflects the light beam coming through the first optical system while rotating around a first axis. The changing element changes a traveling direction of the light beam reflected by the first mirror. The second optical system deflects the light beam coming through the changing element. The changing element changes the traveling direction of the light beam such that an angle of the light beam in the traveling direction which has been reflected by the first mirror is changed more greatly in a peripheral section than in a central section.

6 Claims, 10 Drawing Sheets

(56) References Cited

OTHER PUBLICATIONS

The Extended European Search Report dated Aug. 12, 2019 for the related European Patent Application No. 17846629.8.
Siepmann J P et al: "Integrable Ultra-Compact, High-Resolution, Real-Time MEMS Ladar for the Individual Soldier", Military Communications Conference, 2005. MILCOM 2005. IEEE Atlantic City, NJ, USA Oct. 17-20, 2005, Piscataway, NJ, USA, IEEE, Piscataway, NJ, USA, Oct. 17, 2005 (Oct. 17, 2005), pp. 1-7, XP010901686.

* cited by examiner

DISPLAY DEVICE

TECHNICAL FIELD

The present disclosure relates to display devices, such as head-mount displays, to be positioned near eyes.

BACKGROUND ART

There has been a demand for display devices used in televisions and computer displays to have large screens and high resolutions. Sizes and resolutions of display devices, represented by liquid crystal panels and plasma display panels, have increased year by year. On the other hand, display devices for use in virtual reality applications which have compact bodies but can display high-resolution, realistic images have also attracted attention.

PTL 1 discloses a display device that displays a realistic and eye-friendly image that does not involve observer's serious eyestrain. This display device includes an image display unit for displaying an image, and a projection optical system that projects the image at a predetermined site. The projection optical system includes an ocular optical system that projects the image onto the retina in an observer's eyeball, and a peripherally refracting optical unit. The peripherally refracting optical unit has a peripheral section and is disposed between an optical surface of the ocular optical system and the predetermined site. The optical surface is an optical surface of the ocular optical system which is positioned nearest the predetermined site. The peripheral section possesses higher positive refracting power than positive refracting power of an inner section, and also produces a larger aberration than an aberration of the inner section. This configuration makes it possible to provide a display device that displays a realistic and eye-friendly image that does not involve observer's serious eyestrain.

CITATION LIST

Patent Literature

PTL 1: Japanese Patent No. 3943680

SUMMARY

The present disclosure provides a display device with a simple configuration which can display a substantially high-resolution image with a wide angle of view.

A display device of the present disclosure includes a light source, a first optical system, a first mirror, a changing element, and a second optical system. The light source emits a light beam. The first optical system converts the light beam emitted from the light source into a collimated light beam. The first mirror reflects the light beam coming through the first optical system while rotating around a first axis. The changing element changes a traveling direction of the light beam reflected by the first mirror. The changing element has a central section and a peripheral section outside the central section. The second optical system deflects the light beam coming through the changing element. The changing element changes the traveling direction of the light beam in such a way that an angle of the light beam in the traveling direction which has been reflected by the first mirror is changed more greatly in the peripheral section than in the central section.

The present disclosure can achieve a display device with a simple configuration which can display a high-quality image.

DESCRIPTION OF EMBODIMENTS

Exemplary embodiments will be described below in detail with appropriate reference to the accompanying drawings. However, unnecessarily detailed description will not be given in some cases. For example, detailed description of a matter that has been already known well or overlapping description of substantially the same configuration may be omitted. This is to avoid the following description from being unnecessarily redundant and thus to help those skilled in the art to easily understand the description.

It should be noted that the accompanying drawings and the following description are provided for those skilled in the art to fully understand the present disclosure, and are not intended to limit the subject matter as described in the appended claims.

First Exemplary Embodiment

[1-1. Configuration]

Figure 1:
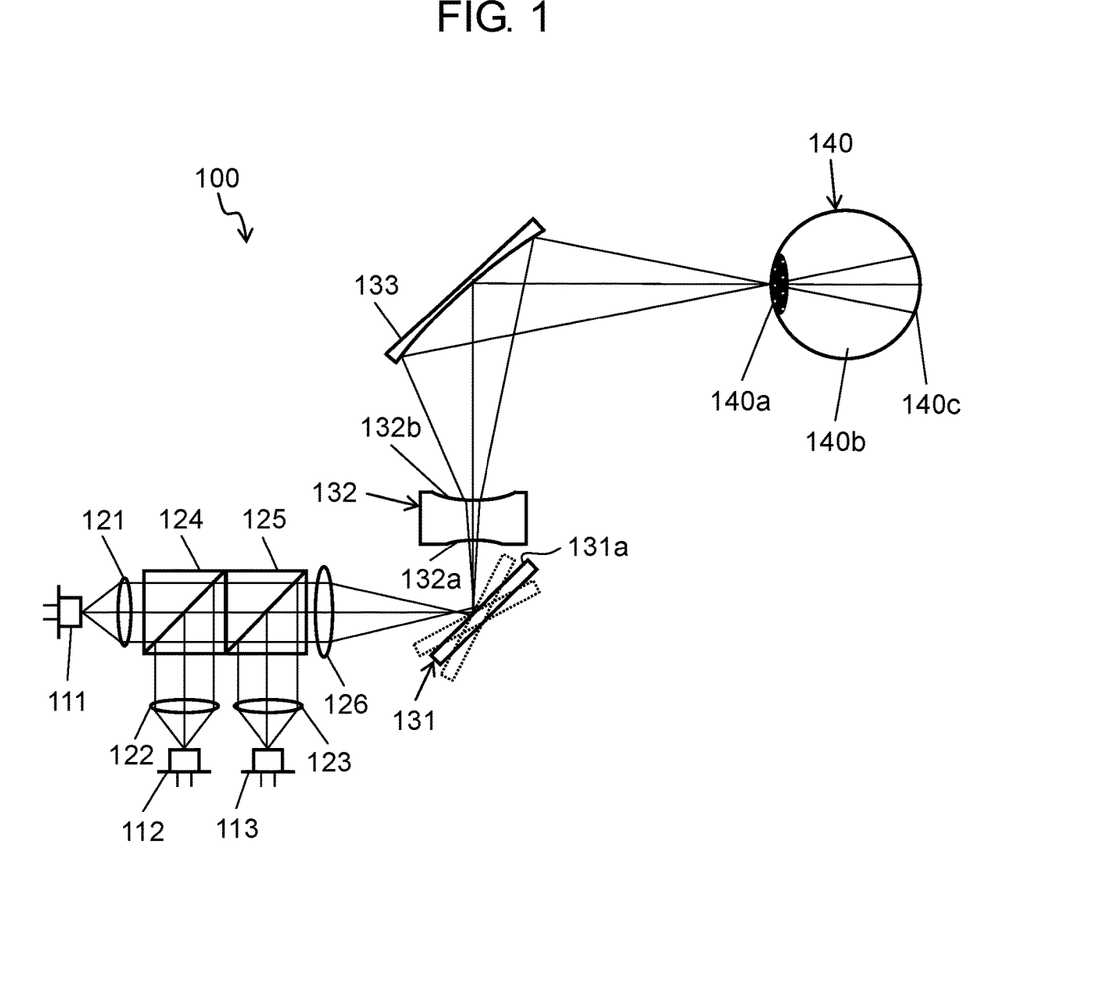
FIG. 1 schematically illustrates a configuration of a display device in a first exemplary embodiment.

FIG. 1 illustrates an example of a configuration of a display device in a first exemplary embodiment.

Display device 100 includes: light sources 111, 112, 113; collimating lenses 121, 122, 123; prisms 124, 125; condensing lens 126; micro electro mechanical systems (MEMS) mirror 131; angle changing element 132; and concave mirror 133. Each of the collimating lenses is an example of a first optical system. Concave mirror 133 is an example of a second optical system. Condensing lens 126 is an example of a third optical system. MEMS mirror 131 is an example of a first mirror. Angle changing element 132 is an example of a changing element.

Display device 100 has light sources 111, 112, 113 to display an image in full color containing red (R), green (G), and blue (B). Light sources 111, 112, 113 emit blue, green, and red light beams, respectively. Each of light sources 111, 112, 113 is a laser light source. In this case, a semiconductor laser element is used as each laser light source. Light sources 111, 112, 113 emit divergent light beams, which then are converted into collimated light beams by collimating lenses 121, 122, 123, respectively. The three resultant collimated light beams pass through prisms 124 and 125 and then travel along a single optical path. After having traveled along the single optical path, the three light beams are collected by condensing lens 126.

Each of collimating lenses 121, 122, 123 and condensing lens 126 may have any given focal length. For example, each focal length is preferably in the range from about 2 mm to 100 mm in terms of a practical size and assembling easiness of display device 100.

The light beams are converted into a convergent light beam by condensing lens 126, and then is incident on MEMS mirror 131. MEMS mirror 131, which is of a piezoelectrically-actuated type, includes single reflective surface 131a and first and second drivers (not illustrated). The first driver rotates reflective surface 131a about a first axis that extends along reflective surface 131a. The second driver rotates reflective surface 131a about a second axis that extends along reflective surface 131a and is optically orthogonal to the first axis. MEMS mirror 131 can change a reflection angle. Specifically, MEMS mirror 131 changes an angle of reflective surface 131a by rotating reflective surface 131a. The angle of reflective surface 131a is changed by application of AC voltages to the first driver and the second driver.

Reflective surface 131a has a circular shape with a diameter about 1 mm. The light beams collected on reflective surface 131a by condensing lens 126 has a smaller size than an area of reflective surface 131a.

An aperture, which is not illustrated in the drawings, is provided on an optical path between light sources 111, 112, 113 and MEMS mirror 131. Providing the aperture in this manner can set the size of the light beam incident on MEMS mirror 131 to a desired size. The aperture may be provided at any given location.

Providing a single aperture between prism 125 and condensing lens 126 can precisely set the sizes of the light beams emitted from three light sources 111, 112, 113 to the same size. This configuration makes it possible to provide a less expensive display device.

A focal position of condensing lens 126 is preferably set near MEMS mirror 131. Setting the focal position of condensing lens 126 near MEMS mirror 131 can decrease a size of the light beam on reflective surface 131a, which is a constituent element of MEMS mirror 131. By decreasing the size of the light beam on reflective surface 131a, reflective surface 131a can be downsized. Smaller-sized reflective surface 131a can be driven at a higher speed. Therefore, the downsizing of reflective surface 131a contributes to the provision of a high-resolution display device.

When reflective surface 131a is driven at a high speed, stress may be generated in response to the driving and warp reflective surface 131a. However, smaller-sized reflective surface 131a is warped less greatly. The warping of reflective surface 131a can be a cause of applying an aberration to the light beam reflected by reflective surface 131a. However, by decreasing the size of the light beam on reflective surface 131a, the aberration applied to the light beam reflected by reflective surface 131a can be reduced. Consequently, it is possible to provide a display device that displays a high-quality image.

Alternatively, the focal position of condensing lens 126 may be set between MEMS mirror 131 and angle changing element 132. This setting can provide a high-resolution display device. However, the focal position of condensing lens 126 is not limited. The focal position may be set properly as long as a displayed image having a desired resolution and quality is obtained.

The first driver for MEMS mirror 131 has a self-resonant frequency of about 30 kHz. This first driver drives reflective surface 131a by using a signal whose frequency is the same as the self-resonant frequency. This can change the angle greatly and periodically with low electricity. More specifically, by driving reflective surface 131a with the signal whose frequency is the same as the self-resonant frequency, the first driver rotates reflective surface 131a periodically in the range from about −15 degrees to +15 degrees. Rotating reflective surface 131a around the first axis forms an image in a horizontal direction.

The second driver for MEMS mirror 131 has a self-resonant frequency of about 600 Hz. This second driver drives reflective surface 131a by using a signal whose frequency is about 60 Hz, which differs from the resonant frequency. The second driver thereby rotates reflective surface 131a periodically in the range from about −7.5 degrees to +7.5 degrees. Rotating reflective surface 131a around the second axis forms an image in a vertical direction.

The frequency of the drive signal for the second driver may be set to be higher than the resonant frequency. This setting leads to the downsizing of the second driver. Consequently, it is possible to provide a compact display device.

If the size of display device 100 is not limited, the frequency of the drive signal for the second driver may be set to the resonant frequency, which leads to the provision of a low-power display device.

To form a two-dimensional image, the light beams from light sources 111, 112, 113 are modulated in synchronization with periods of signals supplied to the first and second drivers.

The signal supplied to the first driver has a period of about 33 ns, which is the reciprocal of 30 kHz. Over this period, light sources 111, 112, 113 are modulated in relation to 2000 pixels. A time span corresponding to one pixel is about 16.5 ns. MEMS mirror 131 makes reciprocal motion, and is used when rotating in both directions. Alternatively, however, MEMS mirror 131 may be used only when rotating in one direction. In this case, the time span corresponding to one pixel is about 8.3 ns, which is a half of 16.5 ns.

Under the above condition, display device 100 can display, at a frame rate of 60 Hz, an image with about 2000 pixels in a horizontal direction and about 1000 pixels in a vertical direction. In other words, display device 100 can display a so-called full high definition (HD or FHD) image with 1920 pixels in the horizontal direction and 1080 pixels in the vertical direction.

Figure 2A:
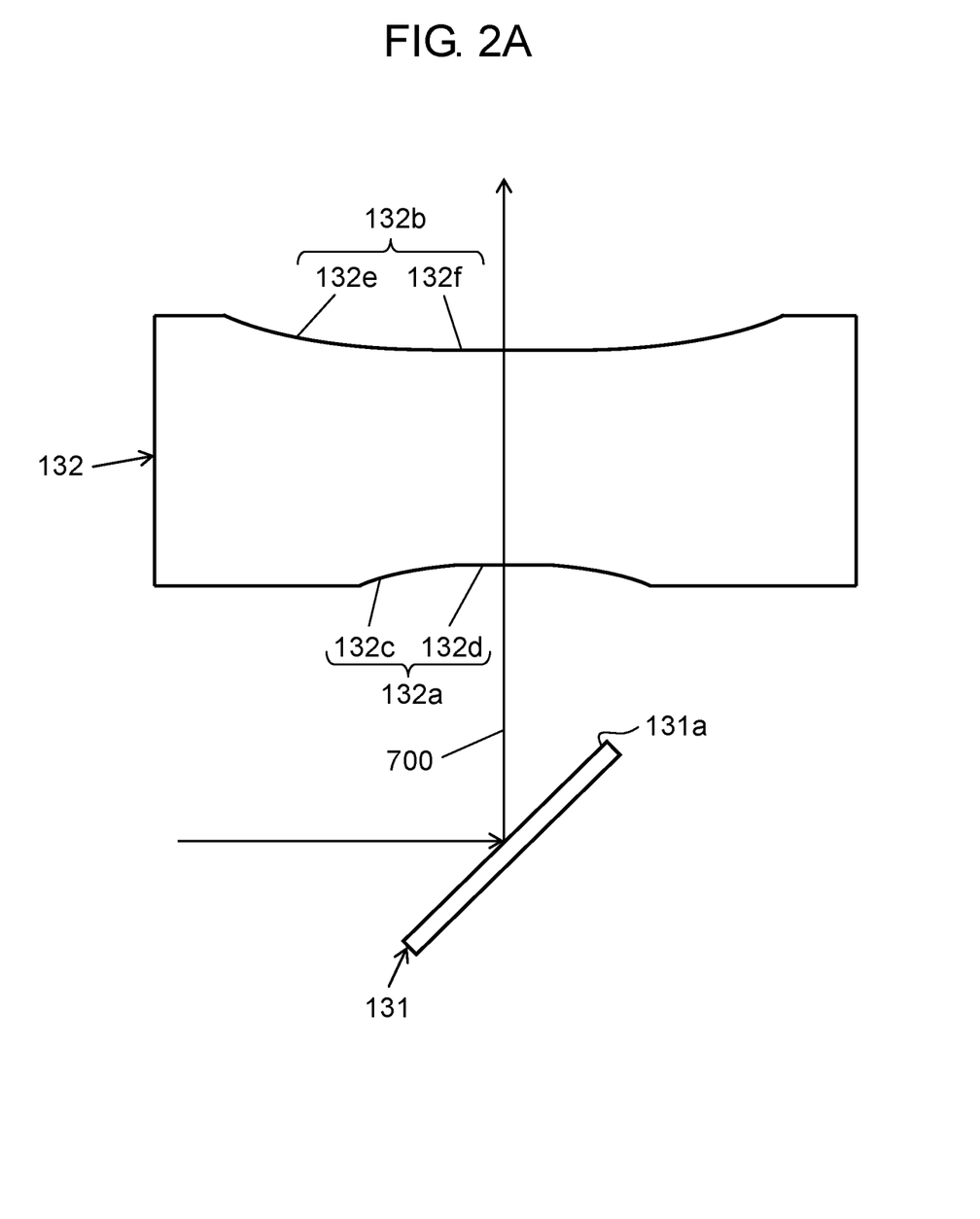
FIG. 2A illustrates an example of a configuration of an angle changing element.
Figure 2B:
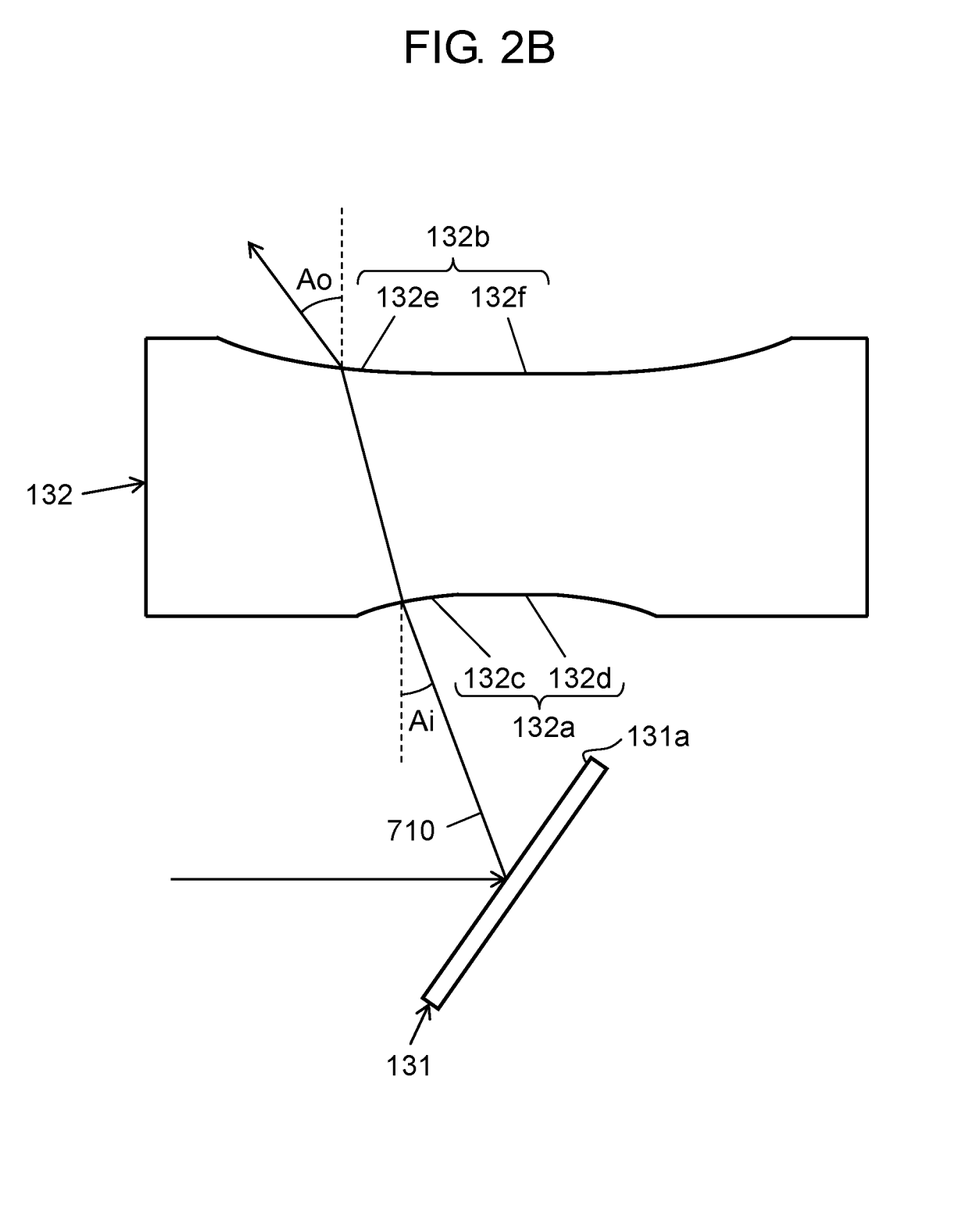
FIG. 2B illustrates another example of the configuration of the angle changing element.

As illustrated in FIGS. 2A and 2B, angle changing element 132 has first light transmitting surface 132a (an example of a first free-form surface) and second light transmitting surface 132b (an example of a second free-form surface) that face each other. The light beam that has been reflected by MEMS mirror 131 enters angle changing element 132 through first light transmitting surface 132a, and then is output from angle changing element 132 through second light transmitting surface 132b. Each of first light transmitting surface 132a and second light transmitting surface 132b is an aspherical and concave surface. Alternatively, first light transmitting surface 132a and second light transmitting surface 132b may be a concave and free-form surface. The shape of each of first light transmitting surface 132a and second light transmitting surface 132b is determined depending on an intended deflection angle of the incoming light beam. An angle of the light beam output from angle changing element 132 depends on an incident location and angle of the incoming light beam. In short, angle changing element 132 changes a traveling direction of the light beam that has been reflected by MEMS mirror 131.

When the light beam that has been reflected by MEMS mirror 131 enters angle changing element 132 in a certain direction, this light beam is output from angle changing element 132 in a different direction. More specifically, an angle of a light beam corresponding to a central section of an image formed by MEMS mirror 131 hardly changes. However, an angle of a light beam corresponding to a peripheral section of the image formed by MEMS mirror 131 greatly changes. The change ratio of the angle is preferably set in the range from about 1 to 5. In this exemplary embodiment, the change ratio is set to about 2.

After having passed through angle changing element 132, the light beam is reflected by concave mirror 133 and then travel toward observer's eye 140. In short, concave mirror 133 deflects the light beam that has passed through angle changing element 132. Concave mirror 133, which may be a free-form surface mirror having a two-dimensional and free-form surface, converts the light beam reflected by concave mirror 133 into a light beam converging toward crystalline lens 140a of eye 140.

The light beam that has been reflected by concave mirror 133 toward eye 140 passes through crystalline lens 140a and vitreous body 140b, which are parts of eye 140. Then, the light beam reaches retina 140c.

An image formed in accordance with the motion of MEMS mirror 131 is projected onto retina 140c.

Immediately after having been reflected by reflective surface 131a of MEMS mirror 131, the light beam corresponds to 2000 pixels in the angle range from −15 degrees to +15 degrees in the horizontal direction and corresponds to 1000 pixels in the angle range from −7 degrees to +7 degrees in the vertical direction. For this reason, the image formed in accordance with the motion of MEMS mirror 131 has 67 pixels per angle. This corresponds to a resolution that a person having eyesight of 1.1 visually perceives.

Figure 3A:
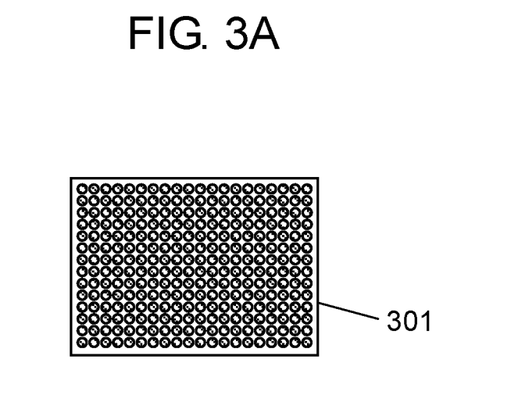
FIG. 3A illustrates an image formed by a conventional display device.

FIG. 3A illustrates an image 301 formed by a conventional display device. Image 301, which is illustrated in a more schematic and rougher manner than an actual one, contains small circular pixels. The pixels are basically arranged at equal intervals throughout the image.

Figure 3B:
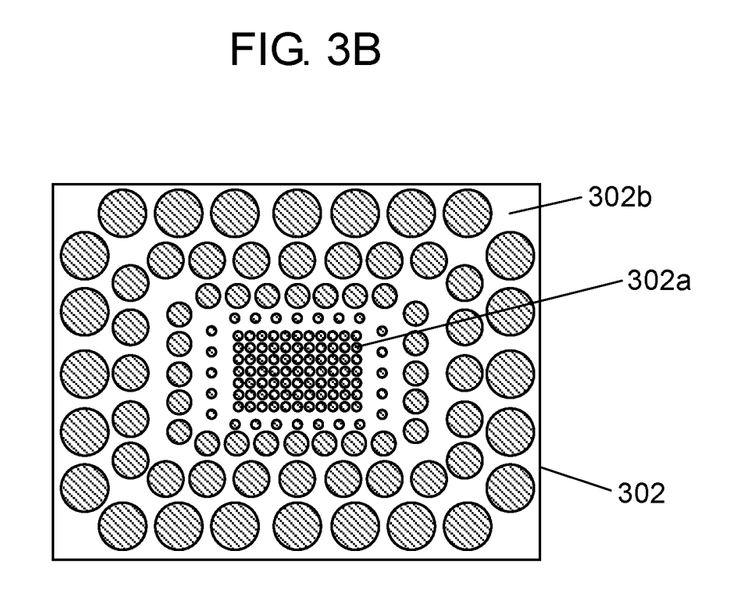
FIG. 3B illustrates an image formed by the display device in the first exemplary embodiment.

FIG. 3B illustrates image 302 formed by display device 100. As with image 301, image 302, which is illustrated in a more schematic and rougher manner than an actual one, contains small circular pixels.

FIGS. 2A and 2B each illustrate an example of the configuration of angle changing element 132. First light transmitting surface 132a has first curved surface 132c and first flat surface 132d. Second light transmitting surface 132b has second curved surface 132e and second flat surface 132f. Further, first flat surface 132d and second flat surface 132f have a parallel relationship. More specifically, first flat surface 132d and second flat surface 132f are formed within a region corresponding to a central section of angle changing element 132. In addition, first curved surface 132c and second curved surface 132e are formed within a region corresponding to a peripheral section (the section outside the central section) of angle changing element 132.

When incident on MEMS mirror 131, the light beam is scanned in accordance with an angle of reflective surface 131a of MEMS mirror 131. As illustrated in FIG. 2A, light beam 700 is scanned by MEMS mirror 131 and then incident on first flat surface 132d. As illustrated in FIG. 2B, light beam 710 is scanned by MEMS mirror 131 and then incident on first curved surface 132c.

After incident on first flat surface 132d, light beam 700 travels inside angle changing element 132 and then is incident on second flat surface 132f. First flat surface 132d and second flat surface 132f are each a flat surface and have a parallel relationship. As a result, light beam 700 is incident on first flat surface 132d of angle changing element 132 and output from angle changing element 132 through second flat surface 132f at the same angle. Thus, after passing through first flat surface 132d and before passing through second flat surface 132f, light beam 700 travels inside angle changing element 132 with the scanning angle of MEMS mirror 131 maintained.

After incident on first curved surface 132c, light beam 710 travels inside angle changing element 132 and then is incident on second curved surface 132e. Since each of first curved surface 132c and second curved surface 132e is a curved surface, angle Ai differs from angle Ao. Angle Ai is an angle at which light beam 710 is incident on first curved surface 132c of angle changing element 132, and angle Ao is an angle at which light beam 710 is output from angle changing element 132 through second curved surface 132e. In this case, angle Ao is twice larger than angle Ai, for example. Both of first curved surface 132c and second curved surface 132e have a concave shape. With this configuration, as the entry of light beam 710 in angle changing element 132 is shifted from the center, angle Ao, at which light beam 710 is output through second curved surface 132e, becomes wider than angle Ai, at which light beam 710 is incident on first curved surface 132c. In other words, angle changing element 132 changes a traveling direction of the light beam reflected by MEMS mirror 131 in such a way that the angle of the light beam changes more greatly in the peripheral section than in the central section of angle changing element 132.

With the principle described above, light beam 700 passes through first flat surface 132d and second flat surface 132f to form central region 302a of image 302 illustrated in FIG. 3B. Likewise, light beam 710 passes through first curved surface 132c and second curved surface 132e to form peripheral region 302b of image 302.

Display device 100 illustrated in FIG. 1 uses angle changing element 132 to form an image with its angle of view being wider than an angle of view of an image formed by MEMS mirror 131. By using angle changing element 132, the light beam is deflected in its peripheral section so that the light beam is widened and doubled in angle. The angle of view of the resultant image is also nearly doubled. More specifically, the angle of view of the image in the horizontal direction is increased so as to fall within the range from −30 degrees to +30 degrees. The angle of view in the vertical direction is also increased so as to fall within the range from −15 degrees to +15 degrees. In this way, a highly realistic image can be provided.

Figure 4:
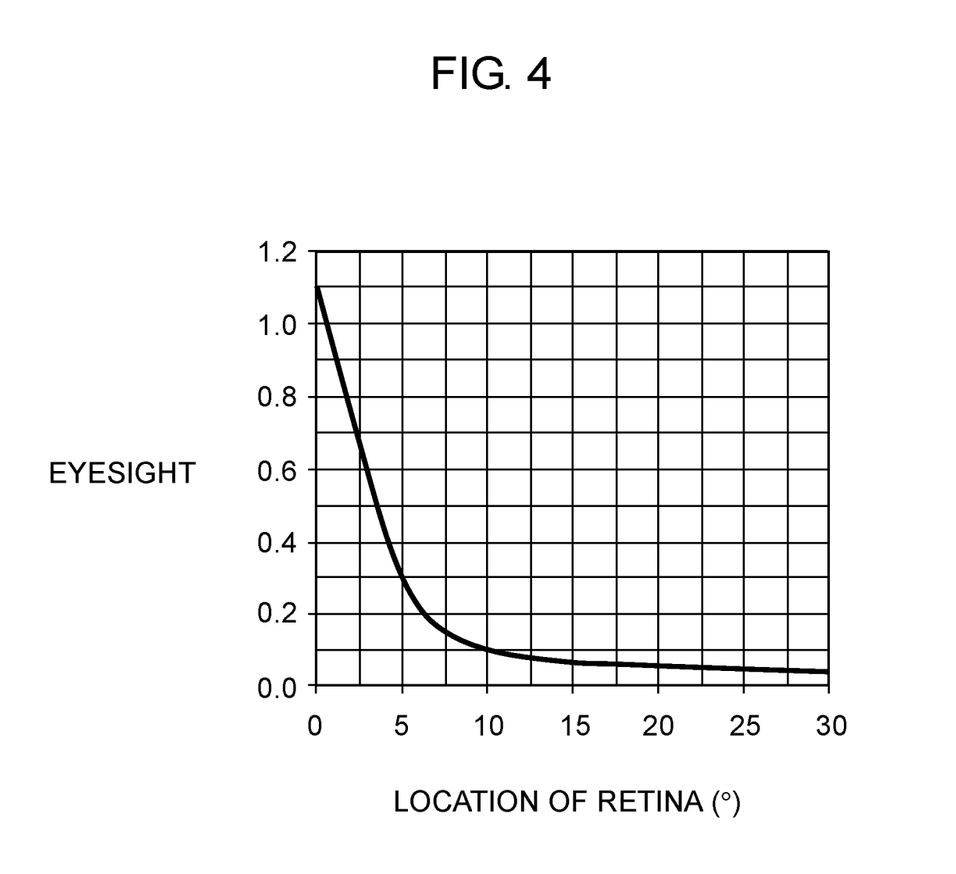
FIG. 4 illustrates a relationship between a human viewing angle and eyesight.

Human eyesight will be described below. As illustrated in FIG. 4, human eyesight is weaker in a peripheral region than in a central region within his/her field of view. When a retina is located at an angle above 5 degrees on the peripheral side within the field of view, the eyesight is 0.3 or less. When the retina is located at an angle above 10 degrees on the peripheral side, the eyesight is 0.1 or less. Therefore, the resolution of the peripheral section of the resultant image is high enough for human eyesight in the peripheral region within the field of view. As a result, no disadvantages arise even when the angle of view of the image is increased with the number of pixels kept constant as illustrated in FIG. 3B. Furthermore, the angle of the light beam does not greatly change in the central section of the image, so that the resolution in the central section of the image is hardly degraded. The resolution of the image is thereby kept high in the central region within the field of view where the human eye has a high resolution. In this way, display device 100 can display an image with substantially a high resolution and a wide angle of view.

The size of the light beam incident on retina 140c can be made a desired size by appropriately designing curvatures and other parameters of first light transmitting surface 132a and second light transmitting surface 132b of angle changing element 132 and concave mirror 133.

In conjunction with the image displayed with a wide angle of view, image data with a wide angle of view is preferably used. This makes it possible to display a more natural image.

The resultant image has a lower resolution in the peripheral section than in the central section. To cope with this decreased resolution, a process such as binning or averaging is applied to the image data. This makes it possible to display a more natural image.

FIG. 1 does not illustrate a thickness of the light beam reflected by MEMS mirror 131 and a divergent angle of the light beam. This is to prevent the light beam from overlapping light scanned depending on amplitude of MEMS mirror 131 and thus from being less viewable. The thickness of the light beam reflected by MEMS mirror 131 and the divergent angle of the light beam are also designed such that the light beam on retina 140c has a desired size. For example, to obtain a resolution corresponding to eyesight 1.0, the size of the light beam on crystalline lens 140a is set to about 2 mm or more.

In the angle changing element 132, each of first light transmitting surface 132a and second light transmitting surface 132b has both curved and flat shapes. However, one of first light transmitting surface 132a and second light transmitting surface 132b may have a flat shape alone. This is because the function of changing the angle of the light beam can be achieved using only one of first light transmitting surface 132a and second light transmitting surface 132b.

By forming both of first light transmitting surface 132a and second light transmitting surface 132b in a curved shape, the angle of the light beam can be changed greatly. In addition, the amount of an aberration such as coma or astigmatism can be easily decreased to a desired amount. Consequently, it is possible to provide a display device that can display a high-quality image.

The description has been given regarding the configuration of angle changing element 132 in which first light transmitting surface 132a has first flat surface 132d and second light transmitting surface 132b has second flat surface 132f. However, the shape of first flat surface 132d and second flat surface 132f is not limited to a flat shape. Alternatively, the shape of first flat surface 132d and second flat surface 132f may be a curved shape in accordance with necessary resolution. Each of first light transmitting surface 132a and second light transmitting surface 132b may have a first region and a second region. The first region may be used by angle changing element 132 to form a central region of an image and allow the entry and output of a light beam at slightly different angles. The second region may be used by angle changing element 132 to form a peripheral region of the image and allow the entry and output of the light beam at greatly different angles.

Display device 100 is provided with condensing lens 126 to decrease the size of the light beams on MEMS mirror 131. However, condensing lens 126 may be optional. If each light source emits a sufficiently intense light beam or if reflective surface 131a can be enlarged, the collimated light beam may enter MEMS mirror 131 not through condensing lens 126. If the collimated light beam enters MEMS mirror 131, angle changing element 132 and concave mirror 133 can be designed very easily.

[1-2. Effect]

Using angle changing element 132 that changes an output angle of a light beam in accordance with a location and angle of an incoming light beam, it is possible to provide display device 100 that can display an image with a substantially high resolution and a wide angle of view.

Second Exemplary Embodiment

Figure 5:
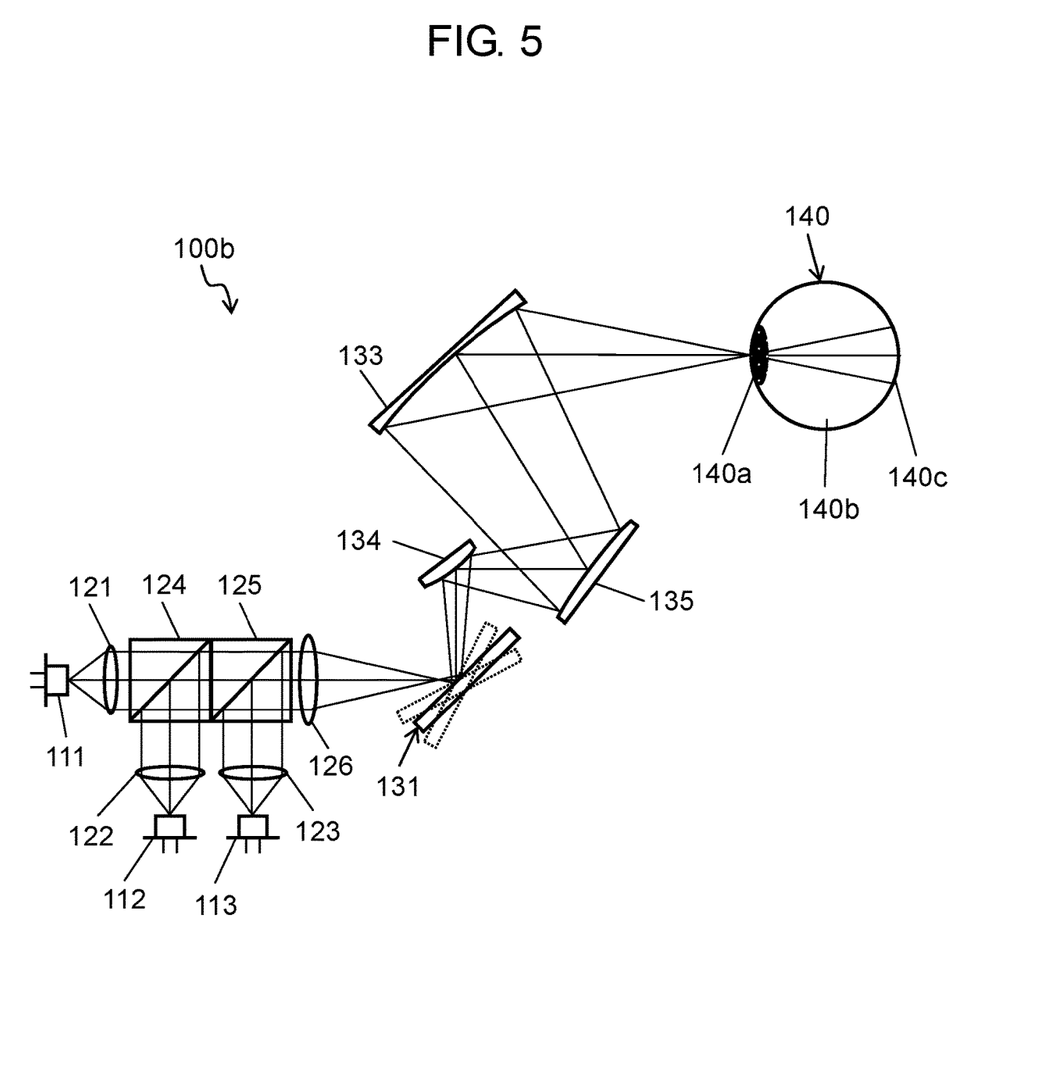
FIG. 5 schematically illustrates a configuration of a display device in a second exemplary embodiment.

FIG. 5 illustrates an example of a configuration of a display device according to a second exemplary embodiment.

The configuration of display device 100b according to the second exemplary embodiment is substantially the same as the configuration of display device 100 according to the first exemplary embodiment illustrated in FIG. 1.

A difference between display devices 100 and 100b is that angle changing element 132 in display device 100 is of a transmissive type whereas an angle changing element in display device 100b is of a reflective type. The angle changing element in display device 100b includes mirror 134 and mirror 135. Each of mirror 134 and mirror 135 is a free-form surface mirror having a convex and free-form surface in a two-dimensional direction and, when receiving a light beam coming from a certain direction, deflects the light beam in a different direction. In short, each of mirror 134 and mirror 135 has a convex reflective surface. Alternatively, the angle changing element according to this exemplary embodiment may include a single mirror.

The angle changing element is similar to angle changing element 132 in the first exemplary embodiment in having first and second regions, which are not illustrated. The first region is used by the angle changing element to form a central region of an image and allows the entry and output of a light beam at slightly different angles. The second region is used by the angle changing element to form a peripheral region of the image and allows the entry and output of a light beam at greatly different angles. An angle of a light beam corresponding to a peripheral section of an image formed by MEMS mirror 131 is changed more greatly than an angle of a light beam corresponding to a central section of the image. As a result, the angle of view of this image is increased. The angle changing element that includes mirror 134 and mirror 135 has a function similar to the function of angle changing element 132 in display device 100.

The second exemplary embodiment employs a reflective angle changing element, thereby suppressing a chromatic aberration from occurring in the angle changing element. Thus, if a light source emits a light beam containing a plurality of wavelength components, any of the wavelength components in the light beam is focused on retina 140c properly. Thus, using a reflective angle changing element, it is possible to provide a display device that can display a high-quality color image even when a light source emits a light beam containing a plurality of wavelength components.

Third Exemplary Embodiment

Figure 6:
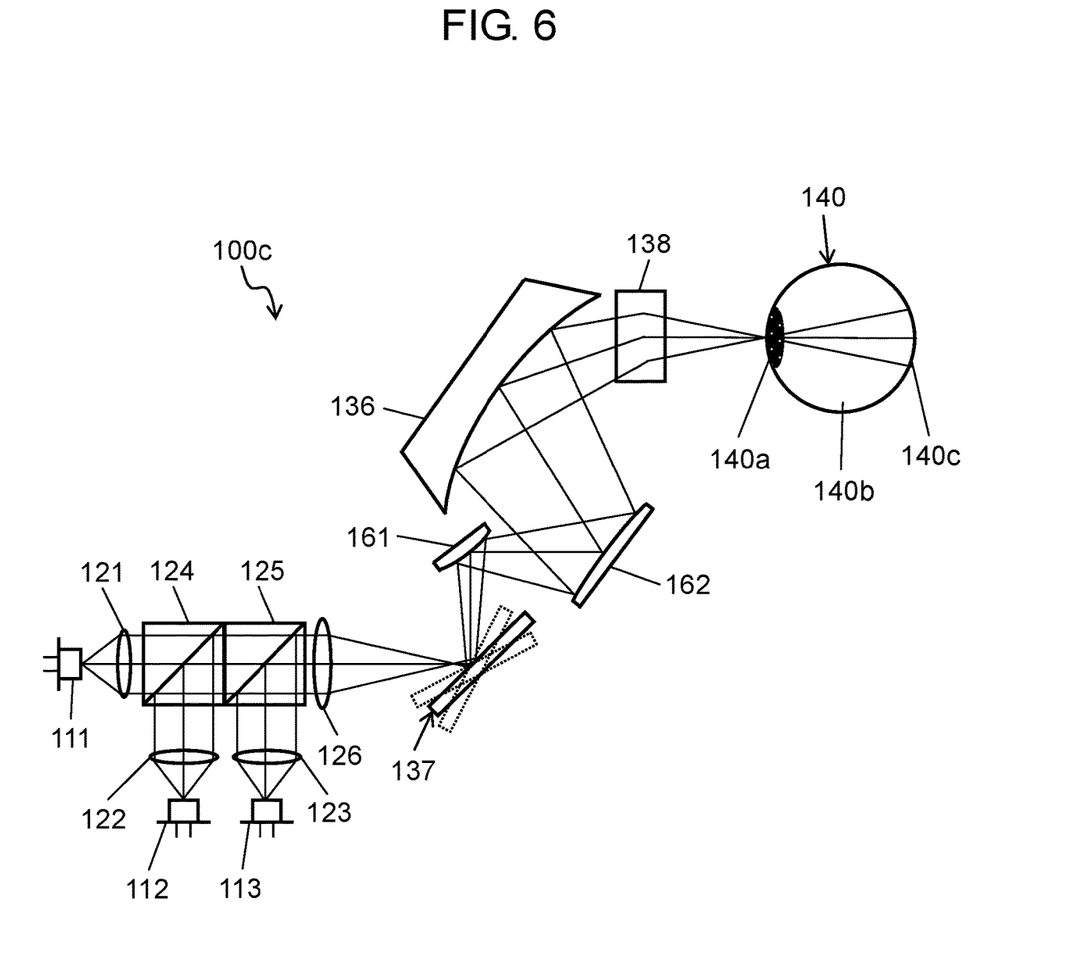
FIG. 6 schematically illustrates a configuration of a display device in a third exemplary embodiment.

FIG. 6 illustrates an example of a configuration of a display device according to a third exemplary embodiment.

Display device 100c according to the third exemplary embodiment is similar to display device 100b according to the second exemplary embodiment in having a reflective angle changing element that includes mirror 161 and mirror 162.

In display device 100b, MEMS mirror 131, which scans the light beams emitted from the light sources to form an image, has reflective surface 131a that is rotatable around the first axis and the second axis. However, display device 100c includes two movable mirrors (i.e., MEMS mirrors 137, 138) in each of which a reflective surface is movable around a single axis.

MEMS mirror 137 (an example of the first mirror), which is of a piezoelectrically-actuated type, scans an image in the horizontal direction. In the MEMS mirror 137, a mirror section may be relatively small in size. To scan the image at a high frequency, MEMS mirror 137 drives the mirror section at its resonant frequency.

The light beam scanned by MEMS mirror 137 is reflected by mirror 161 and mirror 162 that serve as the angle changing element. The angle of view of the image is thereby increased. Each of the mirror 161 and mirror 162 is a free-form surface mirror that has a convex and free-form surface in a one-dimensional direction.

After reflected by mirror 162, the light beam is reflected by concave mirror 136 and thereby deflected toward MEMS mirror 138 (an example of the second mirror).

MEMS mirror 138 scans the image in the vertical direction. More specifically, MEMS mirror 138 reflects the light beam coming through concave mirror 136 while rotating around an axis that is orthogonal to the rotation axis of MEMS mirror 137. MEMS mirror 137 scans the light beams, and mirror 161 and mirror 162, which serve as the angle changing element, magnify the light beam, which then enters MEMS mirror 138. For this reason, the mirror section in MEMS mirror 138 is larger in size than MEMS mirror 137.

MEMS mirror 138 may employ any generally known structure, such as a piezoelectric type or electrostatic type, without restrictions. If MEMS mirror 138 has a large mirror section and needs to swing over a wide angle range at a high drive frequency, MEMS mirror 138 preferably employs an electromagnetically driven type. Electromagnetically driven MEMS mirrors are easy to design, because coils, magnets, and allowable electricity supplied can be designed flexibly. Moreover, as MEMS mirror 138 becomes larger, an electromagnetically driven MEMS mirror becomes less expensive than any other type of MEMS mirror. Consequently, it is possible to provide a low-cost display device.

In this exemplary embodiment, mirror 161 and mirror 162 that constitute the angle changing element increases the angle of view of the image in the horizontal direction. If necessary, however, any additional angle changing element may be provided between MEMS mirror 138 and eye 140 to increase the angle of view in the vertical direction. If it is necessary to increase the angle of view of the image in the vertical direction but unnecessary to increase the angle of view of the image in the horizontal direction, mirror 161 and mirror 162 that serve as the angle changing element do not necessarily have to be provided.

Fourth Exemplary Embodiment

Figure 7:
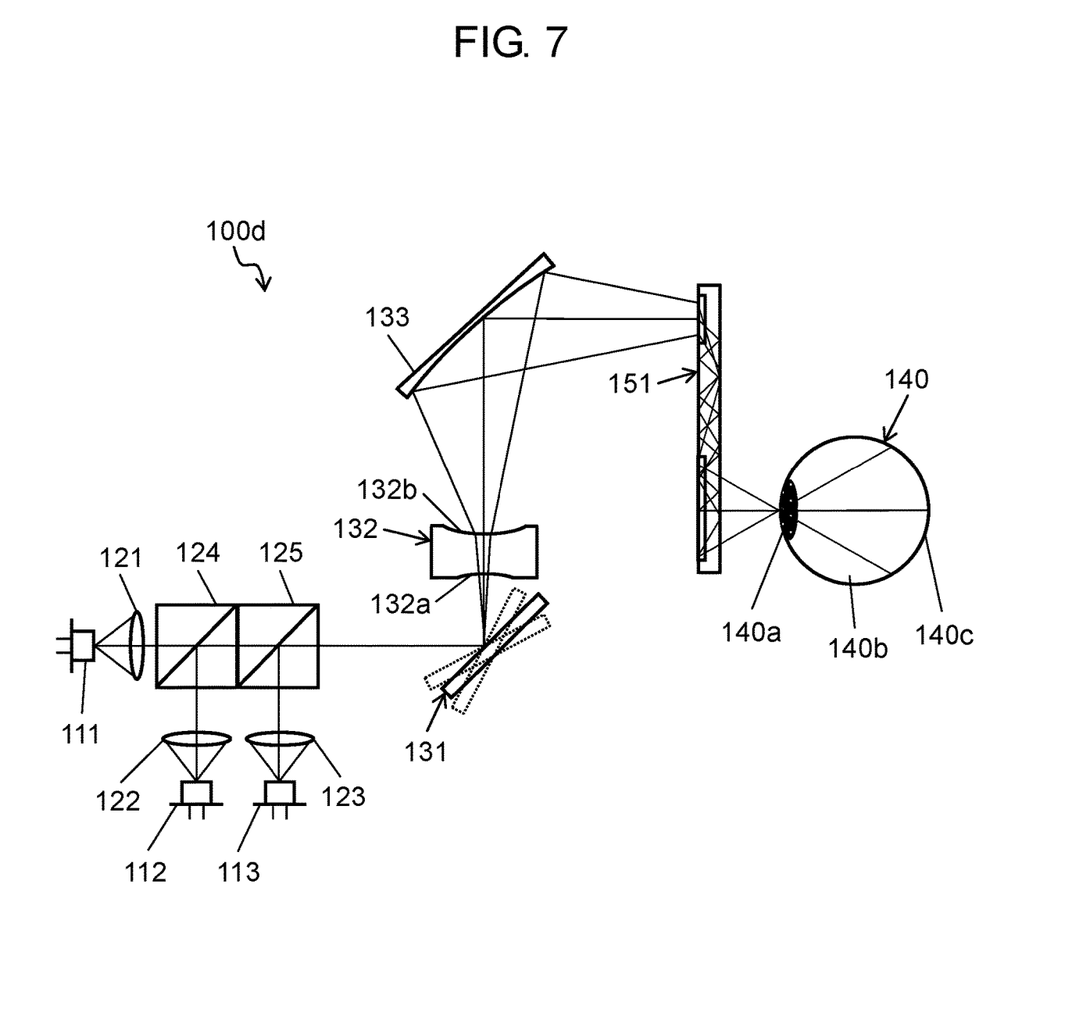
FIG. 7 schematically illustrates a configuration of a display device in a fourth exemplary embodiment.

FIG. 7 illustrates an example of a configuration of a display device according to a fourth exemplary embodiment.

The configuration of display device 100d according to the fourth exemplary embodiment illustrated in FIG. 7 is substantially the same as the configuration of display device 100 according to the first exemplary embodiment illustrated in FIG. 1. Display device 100d according to this exemplary embodiment does not have to be provided with condensing lens 126. In this case, MEMS mirror 131 may reflect the collimated light beam into which each collimator has converted the light beam. In addition, display device 100d may include an aperture (not illustrated), instead of condensing lens 126.

In display device 100, the light beam reflected by concave mirror 133 directly enters eye 140. In display device 100d, the light beam reflected by concave mirror 133 temporarily enters waveguide 151. When entering waveguide 151 at a certain location, the light beam propagates inside waveguide 151 and then is output from waveguide 151 at a different location. The light beam output from waveguide 151 travels toward eye 140.

Figure 8:
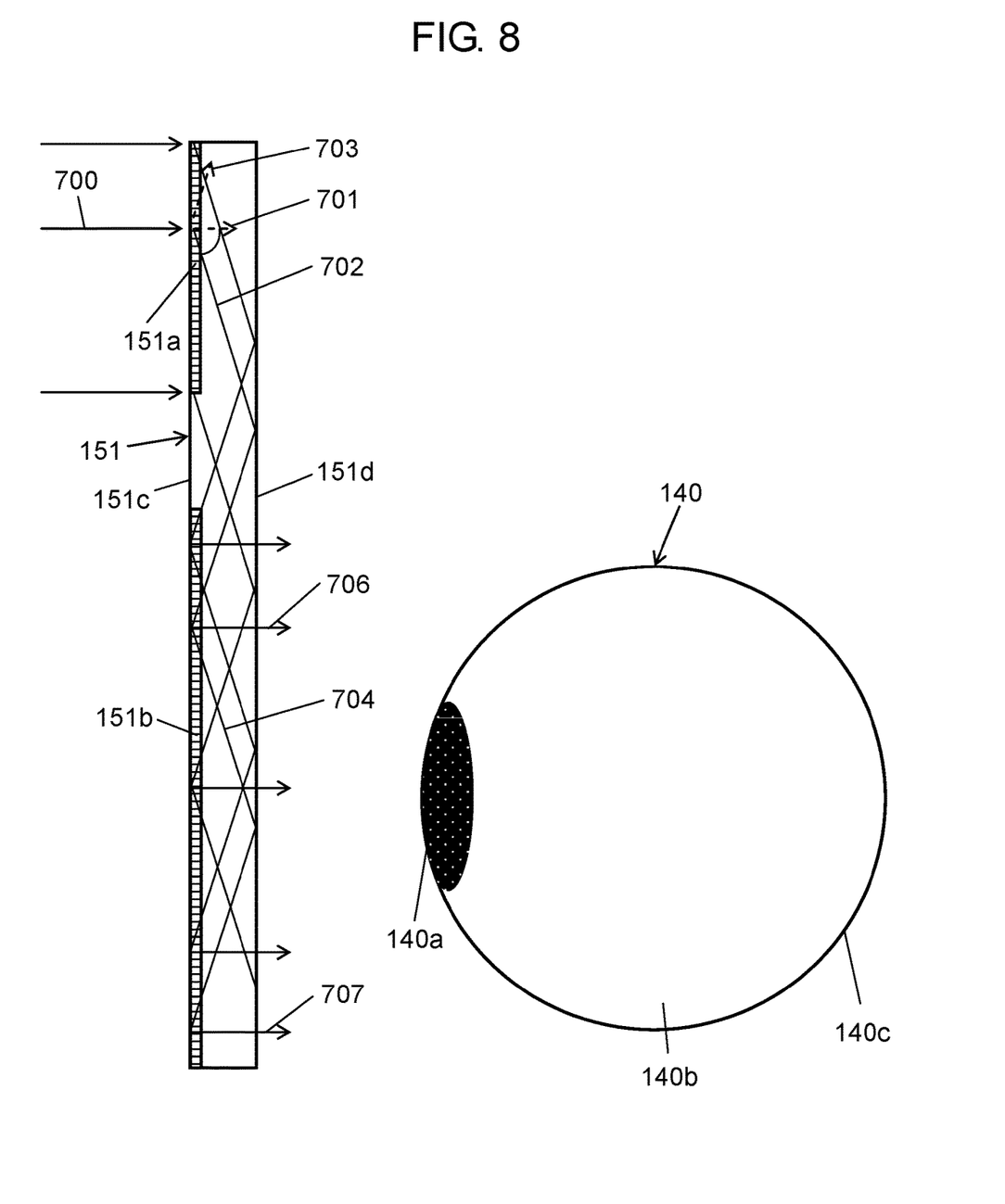
FIG. 8 illustrates a relationship between an eye and a waveguide, which is a constituent element of the display device in the fourth exemplary embodiment.

FIG. 8 schematically illustrates a relationship between waveguide 151 and eye 140. FIG. 8 illustrates light beam 700 that enters waveguide 151 vertically only, for the purpose of helping an understanding of an operating principle of waveguide 151. In addition, light beam 700 propagates in only one direction.

Waveguide 151 includes diffraction grating 151a, 151b and planes 151c, 151d. Diffraction grating 151a is an example of a first diffraction grating. Plane 151d is an example of a reflective surface. Diffraction grating 151b is an example of a second diffraction grating. Plane 151c and plane 151d have a parallel relationship. A material for waveguide 151 only has to be transparent for incident light. The material for waveguide 151 may be a typical optical material, such as glass or resin. In this exemplary embodiment, glass having a refractive index of 1.5 is used. Any typical forming method, such as etching or molding, may be employed as a method of forming diffraction gratings 151a, 151b without restrictions. In this exemplary embodiment, a nanoimprint technique is employed.

When the light beam enters waveguide 151, diffraction grating 151a diffracts the light beam, generating diffracted light beams. In diffraction grating 151a, a 0-order diffracted light beam corresponds to diffracted light beam 701, a +1-order diffracted light beam corresponds to diffracted light beam 702, and a −1-order diffracted light beam corresponds to diffracted light beam 703. Diffraction grating 151a is a diffraction grating that has a constant grating period. Therefore, even when light beam 700 enters any region of diffraction grating 151a, each of diffracted light beams 702, 703 is diffracted at a fixed angle.

Diffraction grating 151a may have a simple binary grating shape. Alternatively, diffraction grating 151a may have a blazed grating shape to use light efficiently. More specifically, diffraction grating 151a may decrease diffracted light beam 701 and diffracted light beam 703 not to be used and in turn may increase diffracted light beam 702.

The period of diffraction grating 151a is set such that diffracted light beam 702 is totally reflected on plane 151d when reaching plane 151d. When the period of diffraction grating 151a is designed in consideration of an incident angle range of light beam 700, the propagation of diffracted light beam 702 in the left direction of the page of FIG. 8, and other parameters, the period of diffraction grating 151a may be on the order of submicron meters. In this case, laser elements that each emit a light beam to be polarized in one direction may be used as the light sources. Furthermore, the polarization direction of the light beam emitted from each laser element may be set such that a diffraction efficiency of the diffraction grating is less likely to be lowered. With this configuration, the display device can exhibit high usage efficiency.

After totally reflected on plane 151d, diffracted light beam 702 propagates toward diffraction grating 151b formed on plane 151c. Since plane 151c and plane 151d have the parallel relationship, diffracted light beam 702 that has been totally reflected on plane 151d is also totally reflected on plane 151c. FIG. 8 illustrates a configuration in which diffracted light beam 702 that has been reflected on plane 151d enters diffraction grating 151b. However, diffracted light beam 702 may be totally reflected on plane 151d and plane 151c multiple times, and then may enter diffraction grating 151b.

Diffraction grating 151b is similar to diffraction grating 151a in having a constant grating period. Diffracted light beam 702 that has been reflected on plane 151d enters diffraction grating 151b. As a result, 0-order diffracted light beam 704 and −1-order diffracted light beam 706 are generated.

The grating period of diffraction grating 151b and the grating period of diffraction grating 151a are set to substantially the same value. As a result, −1-order diffracted light beam 706 that is generated as a result of the entry of +1-order diffracted light beam 702 in diffraction grating 151b is output from waveguide 151 at an angle that is the same as the angle of light beam 700 incident on waveguide 151.

FIG. 8 illustrates a case where light beam 700 is incident on waveguide 151 vertically. However, even when light beam 700 is incident on waveguide 151 diagonally, the same relationship can be maintained.

Diffraction grating 151b may decrease intensity of 0-order diffracted light beam 704 and increase intensity of diffracted light beam 706. In this case, diffraction grating 151b has a blazed grating shape. In some cases, no +1-order diffracted light beams are generated depending on a grating period or an incident angle of a light beam. In such cases, diffraction grating 151b of a binary type can also generate a −1-order diffracted light beam efficiently.

A certain intensity of 0-order diffracted light beam 704 may be generated. In this case, 0-order diffracted light beam 704 is totally reflected on plane 151d, and then reenter diffraction grating 151b. As a result of the reentry of diffracted light beam 704 in diffraction grating 151b, −1-order diffracted light beam 707 is generated. Diffracted light beam 706 and diffracted light beam 707 are output from waveguide 151 at the same angle. Thus, diffracted light beam 706 and diffracted light beam 707 are output from waveguide 151 at different locations but focused on retina 140c of eye 140 at the same location.

By generating −1-order diffracted light beam 707 from diffracted light beam 704 that has reentered in diffraction grating 151b, waveguide 151 outputs a larger amount of light beam than an amount of an incoming light beam.

In the above case, a displayed image is less likely to disappear from the field of view even when eye 140 moves. Consequently, it is possible to provide a display device that is less likely to make an observer feel something strange.

In the above example, diffraction grating 151a is provided on the incident surface of light beam 700 (i.e., plane 151c). However, diffraction grating 151a may be provided on plane 151d. Each of diffraction grating 151a and diffraction grating 151b having a relationship to generate conjugate light beams may be provided on any of plane 151c and plane 151d.

If diffraction grating 151a is provided on plane 151c, waveguide 151 can be of a transmissive type. If diffraction grating 151a is provided on plane 151d, waveguide 151 can be of a reflective type. If waveguide 151 employs a reflective type, a reflective coat may be formed within a region in which diffraction grating 151a is formed. This configuration can use light more efficiently.

If diffraction grating 151a is provided on plane 151d, diffraction grating 151a can be a reflective diffraction grating. In this case, a grating depth of diffraction grating 151a can be set to be smaller than a grating depth of a transmissive diffraction grating. As a result, even if the grating period is on the order of submicron meters, diffraction grating 151a can be formed easily.

If diffraction grating 151b is provided on plane 151d, diffraction grating 151b can be of a transmissive type. If display device 100d is an augmented reality (AR) display device that provides an image to be blended into scenery in the outside world or a mixed reality (MR) display device, the diffraction efficiency of diffraction grating 151b may be set to be lower than the diffraction efficiency of diffraction grating 151a. Moreover, waveguide 151 may output a light beam that is larger in size than an incoming light beam. In such a case, the diffraction efficiency of diffraction grating 151b may be set to be lower than the diffraction efficiency of diffraction grating 151a, even when a display image is less likely to disappear from the field of view regardless of the motion of an eyeball. Thus, diffraction grating 151a and diffraction grating 151b are permitted to have the same grating depth. Waveguide 151 thereby can be fabricated easily. Consequently, it is possible to provide a low-cost display device.

Fifth Exemplary Embodiment

Figure 9:
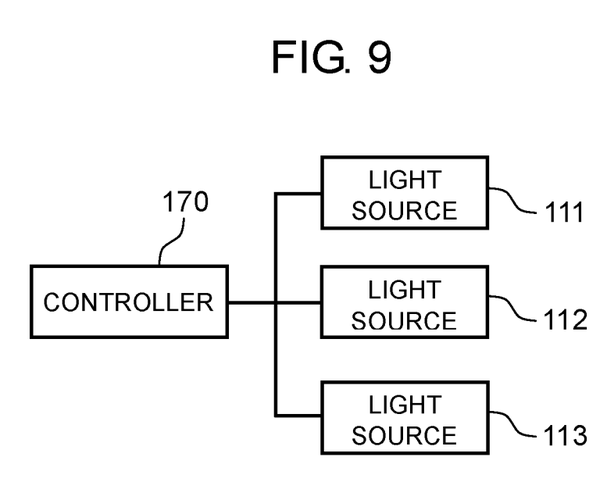
FIG. 9 illustrates a part of a configuration of a display device in a fifth exemplary embodiment.

With reference to FIGS. 1 to 9, a fifth exemplary embodiment will be described. FIG. 9 illustrates a part of a display device according to the fifth exemplary embodiment. The display device according to this exemplary embodiment includes controller 170 in addition to the configuration of display device 100. Controller 170 controls outputs of light sources 111 to 113. Controller 170 is implemented using an integrated circuit, for example.

Controller 170 controls the outputs of light sources 111 to 113 in relation to a size of a light beam on retina 140c, so that the display device provides a less strange image. More specifically, controller 170 may increase the outputs of light sources 111 to 113 as the size of the light beam on retina 140c increases. When controller 170 increases the outputs of light sources 111 to 113 in proportion to an area of the light beam on retina 140c, the display device can provide the least strange image. The word "strange" is a perception that, although the image is displayed, a field of view of the image is shrunk because of its peripheral darkness.

The light beam scanned by MEMS mirror 131 moves on retina 140c at a high speed. Therefore, controller 170 controls the outputs of light sources 111 to 113 in accordance with the speeds of the light beam moving on retina 140c, so that the display device can provide a less strange image. More specifically, controller 170 preferably controls intensity of a light beam emitted from each light source in proportion to the speed of the light beam on retina 140c.

Controller 170 controls the output of each light source in accordance with the size and speed of the light beam on retina 140c, so that the display device can provide a further less strange image.

In addition, an optical detector that detects a portion of the light beam emitted from each light source is not illustrated. The optical detector may be provided in an optical path between the light sources and eye 140 or in a package of each light source. The optical detector may be provided at any given location without restrictions.

The optical detector detects the portion of the light beam emitted from each light source, and then controller controls the output of each light source by using a signal output from the optical detector. In this way, it is possible to precisely set the intensity of the light beam emitted from each light source to a desired value.

Any given method may be used to keep the output of each light source constant, without restrictions. Examples of the method to keep the output of each light source constant may include methods employed in optical disc devices and other known methods.

As described above, the display device according to this exemplary embodiment controls the outputs of the light sources 111 to 113 in relation to the size of the light beam on retina 140c, thereby displaying a less strange image.

Other Exemplary Embodiments

In the first to fifth exemplary embodiments, three light sources are used to display an image in full color containing R, G, and B. If the display device does not have to display an image in full color, however, a smaller number of light sources may be used. For example, if the display device only has to display a monochrome image, a single light source that emits a light beam of a necessary color may be used. In this case, it is possible to provide a compact display device with a simple optical system.

The light sources are not limited to laser elements. Alternatively, light sources having another configuration, such as light emitting diodes (LEDs) or organic electroluminescence (EL) diodes, may be used. Since the amount of light beam entering the eye is expressed in the unit of μW, each light source may emit a much smaller amount of light beam than a light source in any other typical display device. However, the amount of light beam at an emission point, which is optically equivalent, needs to be expressed in the unit of mW. For this reason, a structure in which a micro lens array is mounted over a light source having a large area or in which a light source having a thick light emitting layer, such as a super-luminescent diode (SLD), is provided may be employed. Such configuration enables the display device to output bright light even by using light sources other than laser elements.

The type of MEMS mirror 131 may be selected from piezoelectric, electromagnetic, electrostatic, and others. However, any given type of MEMS mirror 131 may be used without restrictions.

The type of angle changing element 132 may be selected from transmissive, reflective, diffractive, and others.

Concave mirror 133 may be a holographic element, instead of a free-form surface mirror. Using the holographic element makes it possible to provide a more compact display device 100. The type of concave mirror 133 is not limited to a reflective type. Concave mirror 133 may include a transmissive lens and employ a proper configuration in accordance with a size of a necessary optical system.

The number of pixels, frame rate, and other parameters in display device 100 illustrated in FIG. 1 are merely examples and may be modified as appropriate if necessary.

The light beams emitted from light sources 111, 112, 113 may be converted into collimated light beams by collimating lenses 121, 122, 123, respectively, and then the collimated light beams may be combined together. Alternatively, the light beams emitted from light sources 111, 112, 113 may be combined together, and then the combined light beam may be converted into a collimated light beam. In addition, instead of the prism, a parallel plate or optical member having another shape may be used.

Display device 100 may be provided with a sensor such as a gyroscope sensor to detect a face orientation and shift a displayed image in accordance with the face orientation. For example, if a human wishes to clearly view a peripheral section of an image and moves his/her face in a direction toward the peripheral section, the display device may display the image that has been present in the direction, near the center of his/her field of view. Employing this display method enables the human to view an image in a manner similar to the way that he/she acquires surrounding information through the eyes in actual daily life.

INDUSTRIAL APPLICABILITY

In various applications such as business supports, entertainments, and games, the display devices of the present disclosure can be employed as display devices that can provide a feature different from a feature of stationary displays. The display devices of the present disclosure can be employed especially as display devices, such as head-mount displays and head-up displays, which enable observers to view virtual images.

REFERENCE MARKS IN THE DRAWINGS 100, 100b to 100d: display device
111, 112, 113: light source
121, 122, 123: collimating lens (example of first optical system)
124, 125: prism
126: condensing lens (example of third optical system)
131, 137: MEMS mirror (example of first mirror)
131a: reflective surface
132: angle changing element (example of changing element)
132a: first light transmitting surface
132b: second light transmitting surface
133, 136: concave mirror (example of second optical system)
138: MEMS mirror (example of second mirror)
140: eye
140a: crystalline lens
140b: vitreous body
140c: retina
170: controller

The invention claimed is:
1. A display device comprising:
a light source that emits a light beam;
a first optical system that converts the light beam emitted from the light source into a collimated light beam;
a first mirror that reflects the light beam coming through the first optical system while rotating around a first axis;
a changing element that changes a traveling direction of the light beam reflected by the first mirror, the changing element having a central section and a peripheral section outside the central section; and
a second optical system that deflects the light beam coming through the changing element, wherein the second optical system deflects the light beam coming through the changing element toward an observer's eye, the changing element changes the traveling direction of the light beam such that an angle of the light beam in the traveling direction which is reflected by the first mirror is changed more greatly in the peripheral section than in the central section, and a size of the light beam coming through the second optical system onto a crystalline lens of the observer's eye is set to 2 mm or more.

2. The display device according to claim 1, wherein the light source is a laser element.

3. The display device according to claim 1, wherein the first mirror reflects the light beam coming through the first optical system while rotating around the first axis and a second axis, the second axis being orthogonal to the first axis.

4. The display device according to claim 1, wherein the first mirror reflects the collimated light beam resulting from conversion made by the first optical system.

5. The display device according to claim 1, further comprising a third optical system that converts the collimated light beam resulting from conversion made by the first optical system into a convergent light beam, wherein the first mirror reflects the convergent light beam resulting from conversion made by the third optical system.

6. The display device according to claim 1, further comprising a controller that controls an output of the light source in accordance with a size of a light beam on a retina of the observer's eye.

* * * * *